United States Patent
Majcen et al.

(10) Patent No.: US 9,232,772 B1
(45) Date of Patent: Jan. 12, 2016

(54) PET LEASH INCORPORATING COMPARTMENTS FOR STORAGE AND PET CARE ANCILLARY SUPPLIES

(76) Inventors: Marjan Majcen, South Orange, NJ (US); Beverly Burke-Majcen, South Orange, NJ (US); Robert Vreznik, South Orange, NJ (US)

(*) Notice: Subject to any disclaimer, the term of this patent is extended or adjusted under 35 U.S.C. 154(b) by 0 days.

(21) Appl. No.: 12/892,575

(22) Filed: Sep. 28, 2010

(51) Int. Cl.
*A01K 27/00* (2006.01)

(52) U.S. Cl.
CPC ............ *A01K 27/004* (2013.01); *A01K 27/008* (2013.01)

(58) Field of Classification Search
CPC . A01K 27/004; A01K 27/008; A01K 5/0114; A01K 7/00; E01H 2001/128; E01H 1/1206; E01H 2001/1273; E01H 2001/1286
USPC ........................... 119/796, 797, 798, 856, 858
See application file for complete search history.

(56) References Cited

U.S. PATENT DOCUMENTS

| | | | | |
|---|---|---|---|---|
| 5,483,926 | A * | 1/1996 | Bogdahn | 119/796 |
| 5,558,044 | A * | 9/1996 | Nasser et al. | 119/796 |
| 5,887,550 | A * | 3/1999 | Levine et al. | 119/796 |
| 6,223,695 | B1 * | 5/2001 | Edwards et al. | 119/796 |
| 6,289,849 | B1 * | 9/2001 | Macedo et al. | 119/796 |
| 6,314,917 | B1 * | 11/2001 | Ryan | 119/796 |
| 6,516,748 | B1 * | 2/2003 | Jackson | 119/72 |
| 7,044,080 | B2 * | 5/2006 | Rabello | 119/61.56 |
| 7,789,042 | B1 * | 9/2010 | Dinon | 119/61.5 |
| 7,819,088 | B2 * | 10/2010 | Stern | 119/796 |
| 2003/0154931 | A1 * | 8/2003 | Ostrowiecki | 119/796 |
| 2005/0087148 | A1 * | 4/2005 | Rabello | 119/796 |
| 2006/0162675 | A1 * | 7/2006 | Ghalebi et al. | 119/796 |
| 2008/0173257 | A1 * | 7/2008 | Steiner et al. | 119/796 |
| 2008/0216767 | A1 * | 9/2008 | Wang | 119/795 |
| 2010/0018468 | A1 * | 1/2010 | Rabello | 119/61.56 |
| 2010/0043721 | A1 * | 2/2010 | Cigan | 119/796 |
| 2010/0206246 | A1 * | 8/2010 | Waldrep | 119/796 |
| 2010/0220468 | A1 * | 9/2010 | Pearson | 362/192 |
| 2010/0300375 | A1 * | 12/2010 | Yang | 119/796 |
| 2011/0120388 | A1 * | 5/2011 | Shahbaz | 119/796 |
| 2011/0139090 | A1 * | 6/2011 | Harruna | 119/796 |
| 2011/0197820 | A1 * | 8/2011 | Goldy et al. | 119/61.5 |

* cited by examiner

*Primary Examiner* — Yvonne Abbott-Lewis
(74) *Attorney, Agent, or Firm* — Michael I. Kroll

(57) ABSTRACT

A multi-purpose pet leash for tethering an animal with a plurality of components to better care for a pet on the go. The pet leash incorporates dispensable disposable bag(s), reservoir for storing a dispensable product, such as water and/or food and detachable deployable dish for holding the dispensable product.

13 Claims, 9 Drawing Sheets

PET LEASH INCORPORATING COMPARTMENTS FOR STORAGE AND PET CARE ANCILLARY SUPPLIES

BACKGROUND OF THE INVENTION

1. Field of the Invention

The present invention relates generally to animal restraints and, more specifically, to a leash for pets having a plurality of compartments and functions that may be expediently and conveniently accessed by the user to cleanup after or care for their pet.

Comprising the leash is a retractable leash with a clip and latch for restraining a pet, a clip on/off fluid reservoir with a fold out bowl that is stored in the handle to provide nourishment for the pet on the go, and a waste bag storage area for storing of waste bags.

Additionally the present invention has means for attaching and detaching the fluid reservoir by means of clips should the user decide it is un-needed.

2. Description of the Prior Art

There are other leash devices designed for tethering pets. While these leash devices may be suitable for the purposes for which they where designed, they would not be as suitable for the purposes of the present invention as heretofore described.

It is thus desirable to provide a pet leash incorporating an extendable, retractable leash and disposable bag storage housing freeing the user from carrying the disposable bag prior to use.

It is further desirable to incorporate detachable reservoir housing for storage of a fluid, preferably water, and a collapsible dish stored within the pet lease hand grip for use as desired.

SUMMARY OF THE PRESENT INVENTION

A primary object of the present invention is to provide a pet leash for tethering an animal incorporating dispensing means for storing and dispensing at least one disposable bag, reservoir means for storing and dispensing a dispensable product and collapsible dish means for holding the dispensable product.

Another object of the present invention is to provide a pet leash for tethering an animal wherein said dispensing means comprises a post mounting means for spooling the at least one disposable bag thereon and engagable clip means for selectively securing a disposable-bag cover to said pet leash with said cover optionally providing slot means for retrieving the at least one disposable bag therefrom.

Yet another object of the present invention is to provide a pet leash for tethering an animal having a foldable dish in its handle for serving a pet food or water.

Still yet another object of the present invention is to provide a pet leash for tethering an animal wherein said reservoir means for storing and dispensing a dispensable product comprises a detachable reservoir having cap sealing means providing selective access to a dispensable product including water and/or food.

Another object of the present invention is to provide a pet leash for tethering an animal wherein said collapsible dish means comprises a folded dish, preferably stored in the hand grip of the pet leash that is selectively retrievable for holding the dispensable product contained within the reservoir.

Additional objects of the present invention will appear as the description proceeds.

The present invention overcomes the shortcomings of the prior art by providing a pet leash for tethering an animal with a plurality of components to better care for a pet on the go. The pet leash incorporates dispensable disposable bag(s), reservoir for storing a dispensable product, such as water and/or food and detachable deployable dish for holding the dispensable product.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
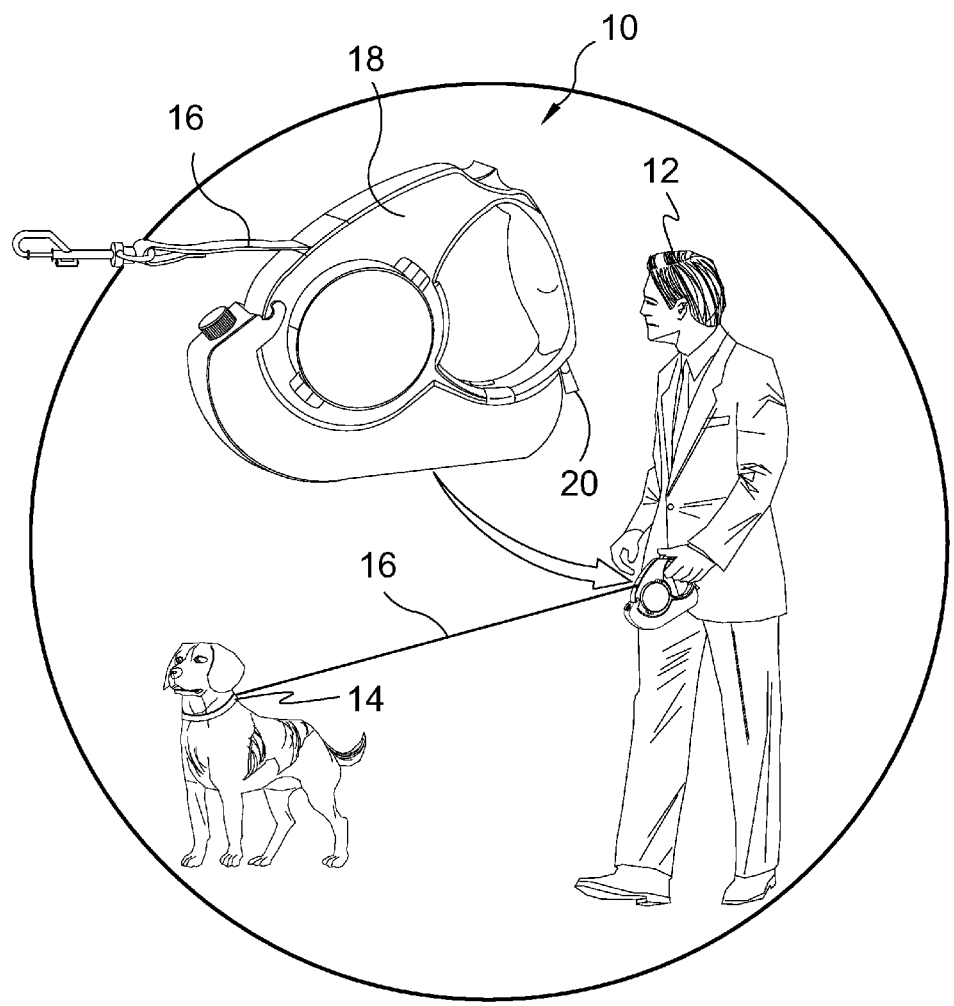
FIG. 1 is an illustrative view of the pet leash in use.

Turning now descriptively to the drawings, in which similar reference characters denote similar elements throughout the several views, the figures illustrate the Multi-Purpose Pet Leash of the present invention. With regard to the reference numerals used, the following numbering is used throughout the various drawing figures.

10 Multi-Purpose Pet Leash of the present invention
12 user
14 pet
16 retractable pet tether
18 leash housing
20 collapsible dish
22 fluid reservoir
24 waste bag
26 waste bag housing
28 reservoir cap member
30 reservoir latch
32 reservoir clip
34 leash latch
36 leash fastener 38 access port
40 waste bag spool
42 waste bag housing clips
44 handle
46 collapsed position of 20
48 deployed position of 20
50 conduit
52 foldable section of 20
54 gasket of 20
56 stop gasket of 50
58 waste bag gap

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the multi-purpose pet leash 10 in use. Shown is the user 12 walking his dog 14 with a multi-purpose pet leash 10 having spring biased means for extending and retracting the spring loaded retractable pet tether 16 from the leash housing portion 18 to a desired length. Further incorporated is a fluid reservoir and collapsible dish 20 so that a user 12 can provide their pet 14 with water and/or food while walking and at least one spooled waste bag housed within a waste bag holder.

Figure 2:
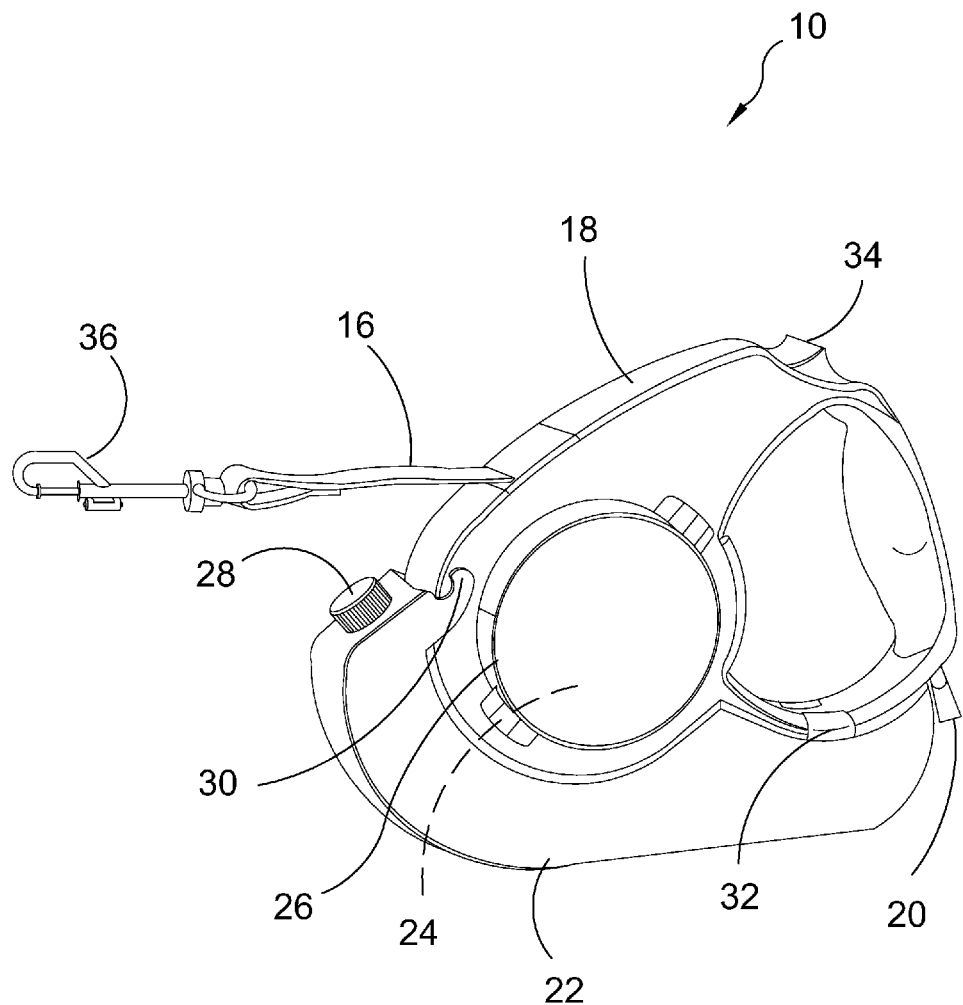
FIG. 2 is an illustrative view of the pet leash.

FIG. 2 is an illustrative view of the multi-purpose pet leash 10. The present invention is a pet leash having a retractable tether portion 16 and a leash housing 18 with collapsible detachable bowl 20 so that a user can provide the pet with water and/or food as needed and further providing at least one pet waste bag 24 stored within the waste bag housing 26. The fluid reservoir 22 is secured and released from the leash housing 18 by a reservoir latch 30 and clips 32. A removable reservoir cap 28 provides access therein. At least one waste bag 24 is contained within the waste bag housing 26. The tether 16 is locked and released by the user with a leash latch 34 and a leash faster 36 is disposed on the distal end of the tether 16 for attachment to a pet's collar.

Figure 3:
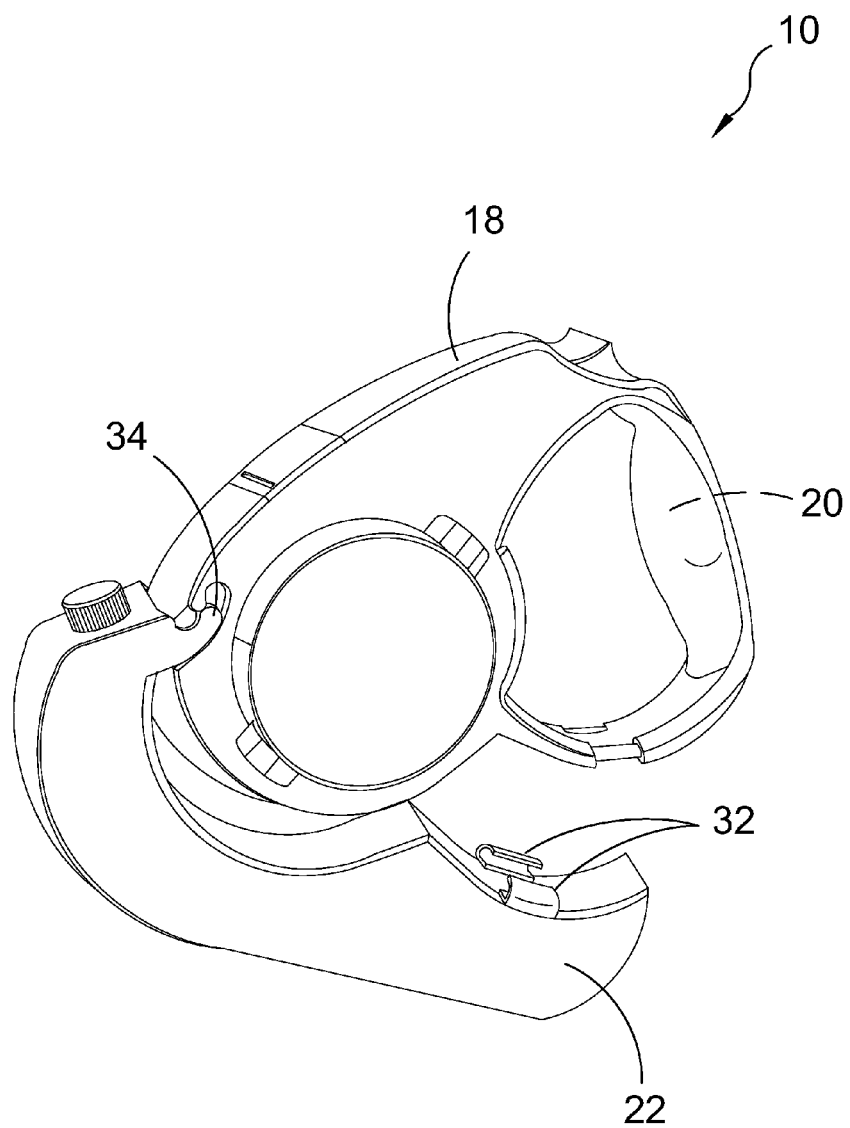
FIG. 3 is a partial exploded view of the pet leash of the present invention.

FIG. 3 is a partial exploded view of the multi-purpose pet leash 10 of the present invention. Shown are the clips 32 of the fluid reservoir 22 being detached from the leash housing 18 while pivoting on the leash reservoir latch 34. Also shown is the dish 20 releasably stored within the leash housing 18 and deployable therefrom.

Figure 4:
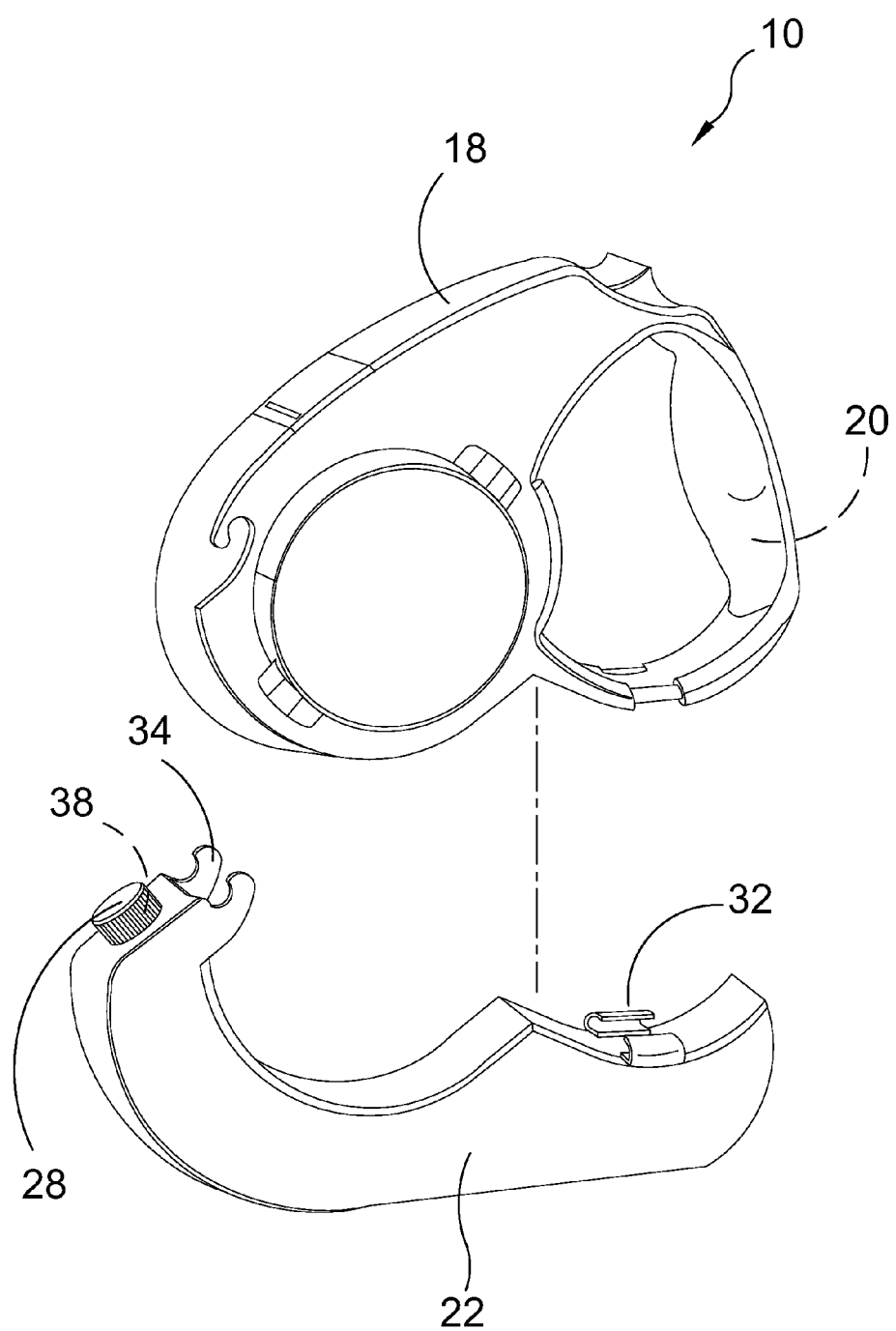
FIG. 4 is an exploded view of the pet leash of the present invention.

FIG. 4 is an exploded view of the multi-purpose pet leash 10 of the present invention. Shown is the fluid reservoir 22 detached from the leash housing 18 by the reservoir latch 30 and clips 32 so that a quantity of water and/or food can be dispensed through the access port 38 covered by the cap 28 into the dish 20 once detached and deployed from its seated position within the leash housing 18.

Figure 5:
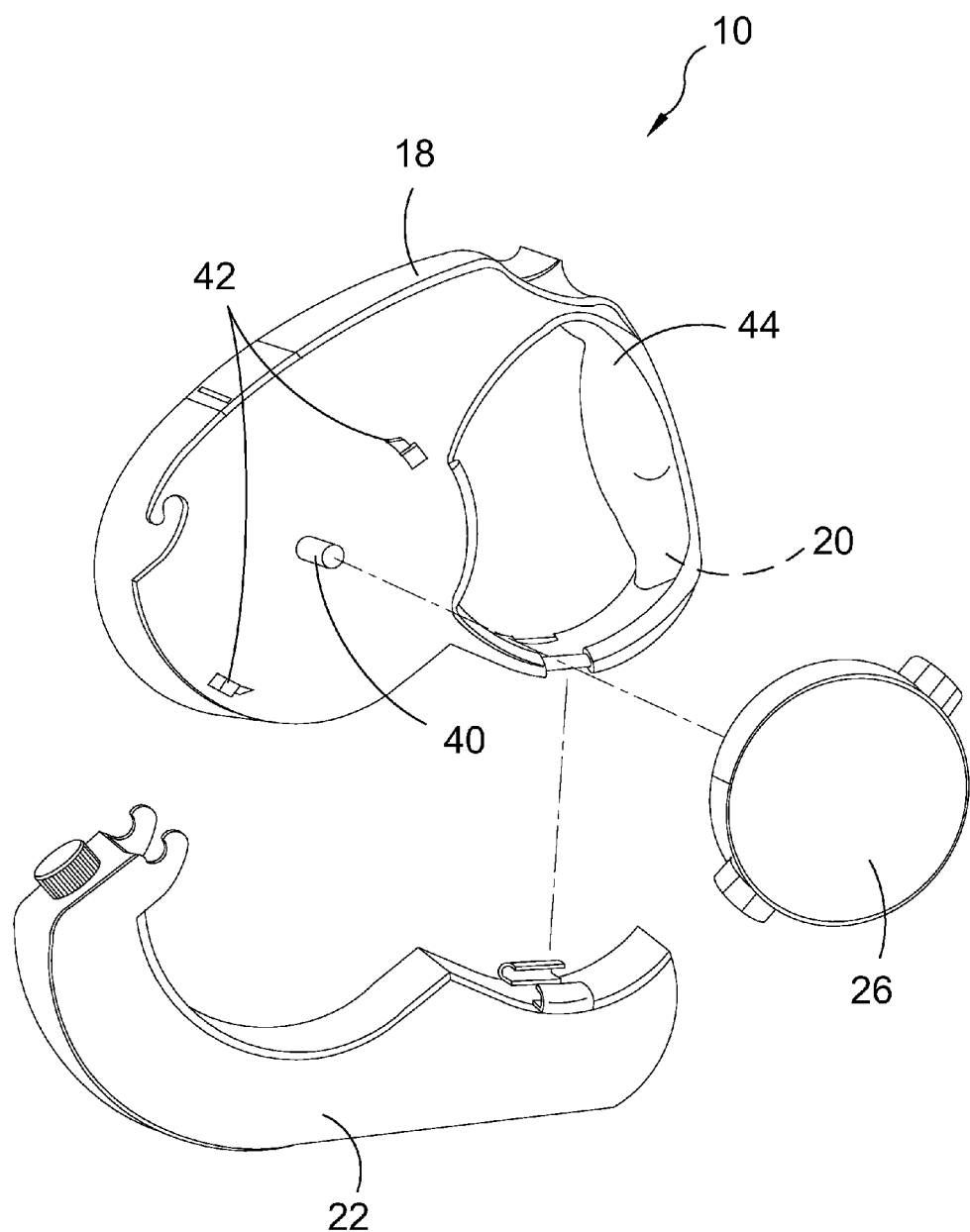
FIG. 5 is an exploded view of the pet leash of the present invention.

FIG. 5 is an exploded view of the multi-purpose pet leash 10 of the present invention. Shown is the multi-purpose pet leash 10 with the liquid reservoir 22 and waste bag housing 26 removed from the leash housing 18. At least one waste bag is posted onto a spool 40 for when needed to bag pet waste. Also shown are waste bag housing clips 42 for fastening the waste bag housing 26 to the leash housing 18. The collapsible dish 20 is stored within the handle 44 of the leash housing 18

Figure 6:
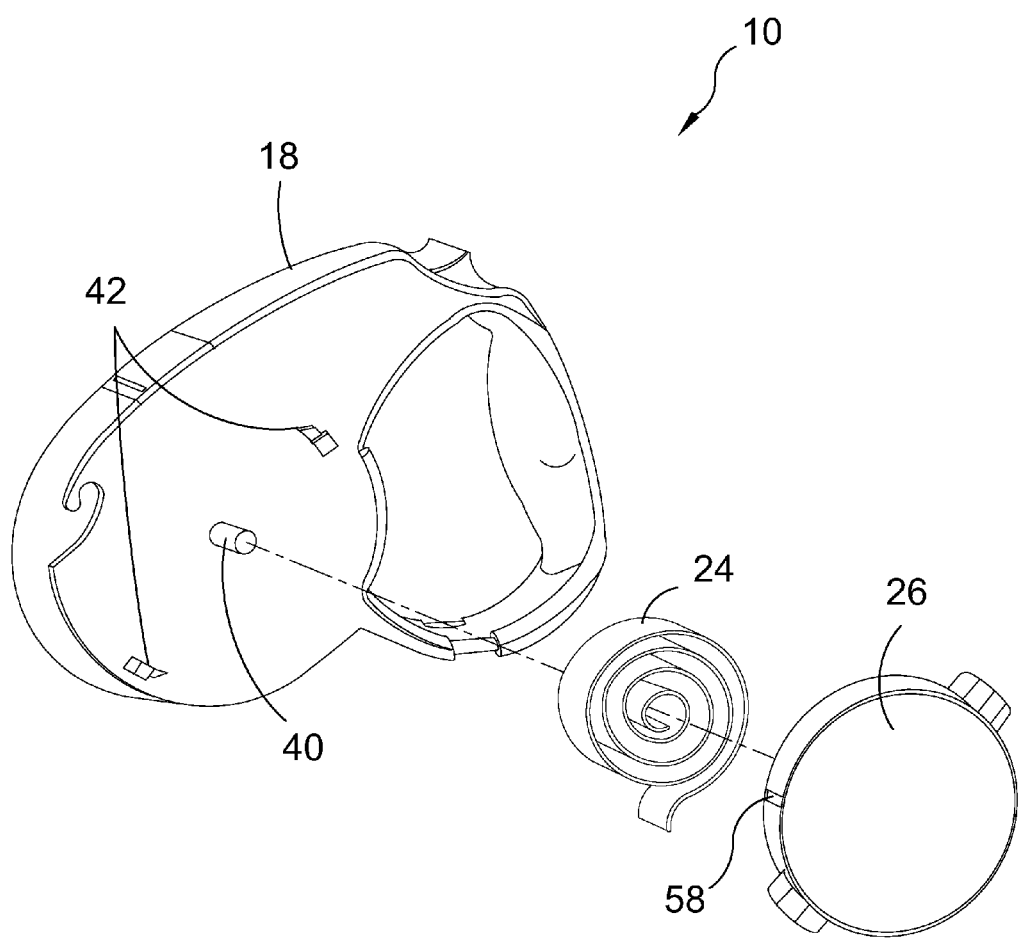
FIG. 6 is an exploded view of the pet leash of the present invention.

FIG. 6 is an exploded view of the multi-purpose pet leash 10 of the present invention. Shown is an exploded view of the waste bag housing 26 removed from the leash housing 18. The present invention provides storage for pet waste bags 24 with at least one placed on a spool 40 and having waste bag housing clips 42 for fastening the waste bag housing 26 to the leash housing 18. The waste bags 24 are distributed through a waste bag gap 58 disposed on the side of said waste bag housing 26.

Figure 7:
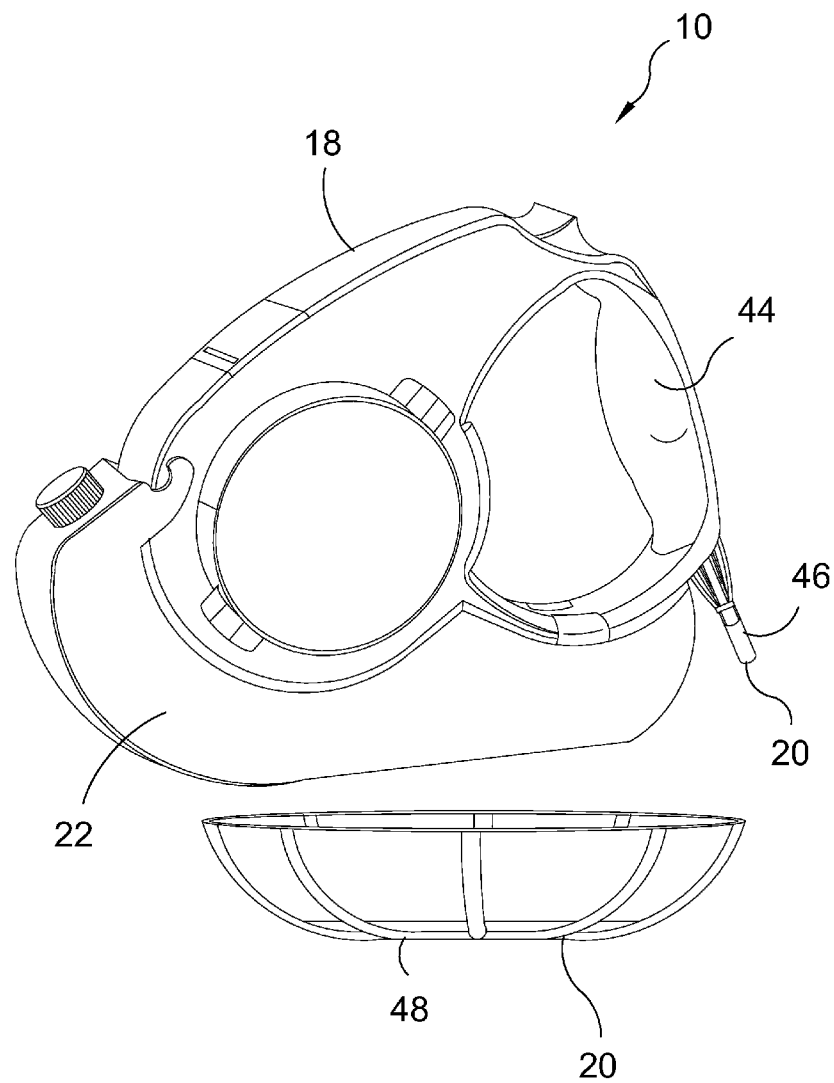
FIG. 7 is an exploded view of the pet leash showing the dish of the present invention.

FIG. 7 is an exploded view of the multi-purpose pet leash 10 showing the dish 20 of the present invention. The present invention provided a collapsible dish 20 stored within the handle 44 of the leash housing 18 of the pet leash that can be withdrawn from its collapsed seated position 46 and deployed 48 to its bowl-like state for receiving a quantity of fluid from the fluid reservoir 22.

Figure 8:
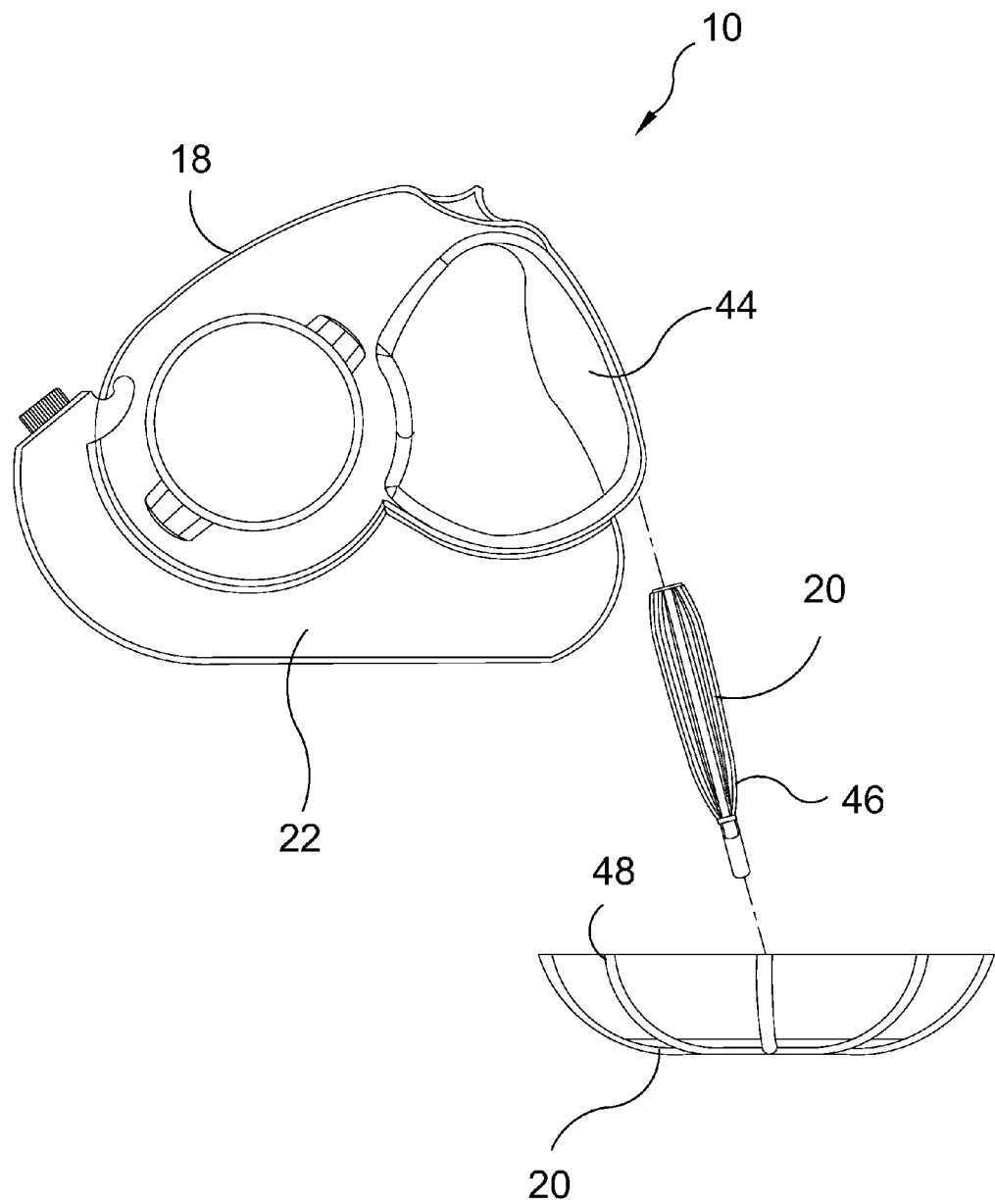
FIG. 8 is an exploded view of the pet leash of the present invention.

FIG. 8 is an exploded view of the multi-purpose pet leash 10 of the present invention. Shown is the pet leash having a liquid reservoir 22 and collapsed dish 20 that is storable within the handle 44 of the leash housing 18 until needed wherethen the collapsed dish 46 is removed and deployed 48 to its bowl-like state for receiving an amount of fluid or granular product from the reservoir 22.

Figure 9:
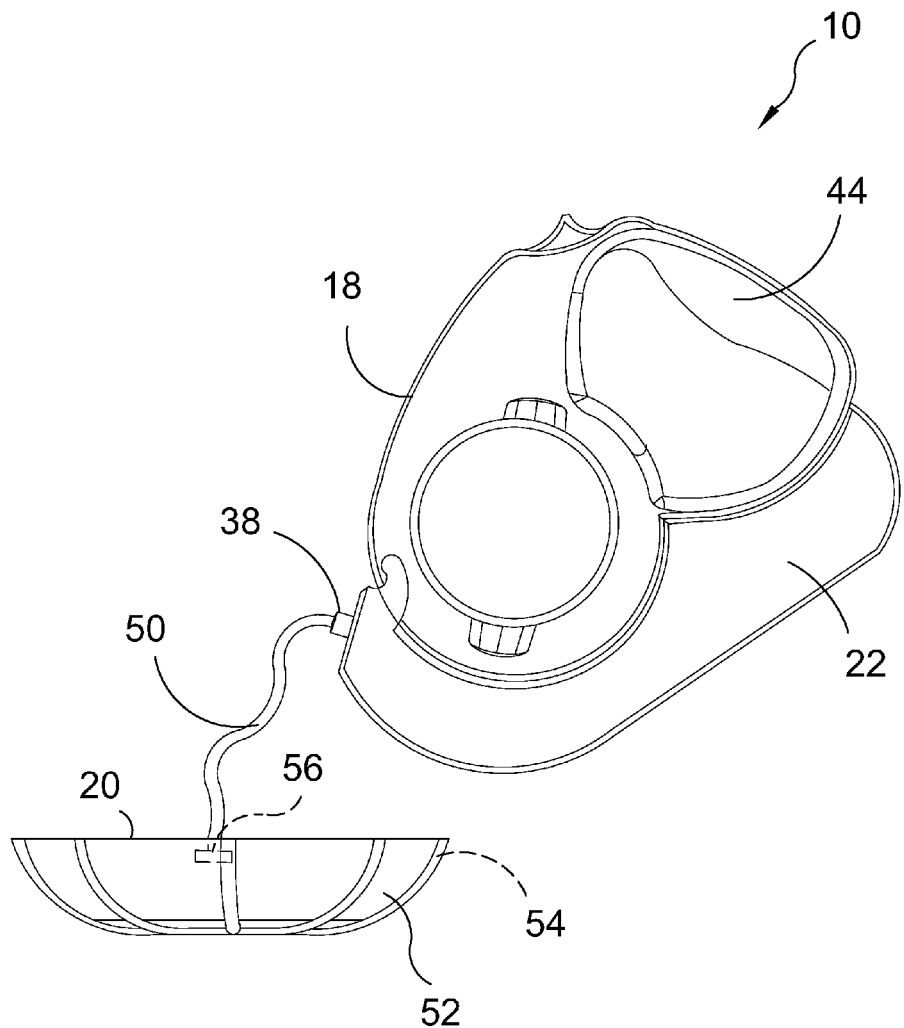
FIG. 9 is an exploded view of the pet leash of the present invention in use.

FIG. 9 is an exploded view of the multi-purpose pet leash 10 of the present invention in use. Shown is the pet leash having a dispensable product reservoir 22 and collapsible dish 20 storable within the handle 44 in the leash housing 18 until needed wherethen the collapsed dish is removed and deployed to its bowl-like state for receiving an amount of dispensable product from the reservoir 22. The dish 20 is divided into a plurality of foldable sections 52 with peripherally disposed gaskets 54. Shown is a conduit 50 in communication with the access port 38 for aiding in the distribution of the contents contained therein. The conduit 50 has a stop gasket 56 disposed on the distal end thereof to prevent the conduit 50 from falling inside the reservoir 22 and to form a seal when the cap is screwed thereon.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A multi-purpose pet leash for providing a plurality of functions when walking a pet comprising:
   a) a leash housing;
   b) a spring loaded retractable/extendible tether disposed within said leash housing;
   c) a detachable product reservoir affiliated with said leash housing and said reservoir is replaceably securable to said leash housing by a pair of clips on one end thereof and a reservoir latch on the opposing end thereof and mating components on said leash housing wherein engagement and disengagement of said clips enables said reservoir to pivot on said latch to accomplish the removal or securement of said reservoir therewith;

d) a waste bag housing associated with said leash housing for retaining at least one waste bag therein;

e) a collapsible dish stored within said leash housing; and f) said reservoir further includes an access port for filling it with liquid or solid product and distributing it therefrom.

2. The multi-purpose pet leash according to claim 1, wherein said spring loaded retractable/extendible tether is lockable and freely extendible and retractable.

3. The multi-purpose pet leash according to claim 2, wherein said spring loaded extendible/retractable tether is selectively lockable at a user chosen length by a leash latch that locks and frees said tether accordingly.

4. The multi-purpose pet leash according to claim 1, wherein said access port further comprises a screw on cap member for retaining the contents within said reservoir when not in use.

5. The multi-purpose pet leash according to claim 4, wherein said access port further comprises a feeder conduit in communication with said access port for accurately and precisely distributing fluid contents from said reservoir.

6. The multi-purpose pet leash according to claim 5, wherein said feeder conduit further includes a stop gasket disposed on the distal end thereof to enable said conduit to retract without falling therein and forming a seal when said cap member is installed thereon.

7. The multi-purpose pet leash according to claim 1, wherein said leash housing further comprises a handle portion disposed thereon.

8. The method of utilizing a multi-purpose retractable pet leash for performing multiple tasks when walking a pet involving the steps of:

a) providing a retractable pet leash comprising a leash housing containing a retractable/extendible tether having a leash fastener on the distal end thereof, a leash latch for locking and releasing said tether, a handle portion for storing a collapsible dish therein, a spool for removably storing at least one pet waste bag thereon, a detachable waste bag housing to cover said at least one waste bag and associated spool, clips disposed on said leash housing for receiving said waste bag housing, a waste bag gap disposed on the side of said waste bag housing for delivering a waste bag therethrough, a detachable reservoir on said leash housing for storing fluid or solid food for said pet, a mating clip and latch configuration for attaching and detaching said reservoir from said leash housing, a screw on cap member for an access port on said reservoir for retaining stored contents therein, an extendable conduit communicating with the inside of said reservoir and the outside portion, a stop gasket disposed on the exterior distal end of said conduit to prevent said conduit from submerging into said reservoir and sealing said access port when said cap is in place and said collapsible dish segmented into a plurality of foldable sections;

b) removing said waste bag housing from said leash housing and spooling at least one said waste bag to said spool with the end extending through said waste bag gap and securing said waste bag housing back into position;

c) removing said reservoir from said leash housing and unscrewing said cap member from said access port, filling said reservoir with content and reengaging said reservoir with said leash housing;

d) fastening said leash fastener to pet's collar;

e) determining the length of said extended tether by utilizing said leash latch;

f) removing said collapsible dish from said handle portion and deploying to a bowl like configuration;

g) disengaging said reservoir from said leash housing, removing said cap member and withdrawing said conduit therefrom;

h) pouring said fluid from said reservoir into said collapsible bowl;

i) reinserting said conduit into said reservoir, replacing said cap member and reengaging said reservoir with said leash housing; and j) removing one of at least one said pet waste bags from said waste bag housing and cleaning up after said pet.

9. The method of utilizing a multi-purpose retractable pet leash for performing multiple tasks when walking a pet according to claim 8, further providing gasket elements disposed on the peripheral edges of said sections of said collapsible dish to form a leak proof seal for retaining fluid therein during use.

10. A multi-purpose pet leash for providing a plurality of functions when walking a pet comprising:

a) a leash housing;

b) a spring loaded retractable/extendible tether disposed within said leash housing;

c) a detachable product reservoir affiliated with said leash housing;

d) a waste bag housing associated with said leash housing for retaining at least one waste bag therein, said waste bag housing being removable from said leash housing by a pair of corresponding mating clips;

e) a collapsible dish stored within said leash housing; and f) said at least one pet waste bag being mounted on a spool disposed on a side of said leash housing.

11. The multi-purpose pet leash according to claim 10, wherein said at least one pet waste bag is delivered through a waste bag gap disposed in the side of said waste bag housing.

12. A multi-purpose pet leash for providing a plurality of functions when walking a pet comprising:

a) a leash housing;

b) a spring loaded retractable/extendible tether disposed within said leash housing;

c) a detachable product reservoir affiliated with said leash housing;

d) a waste bag housing associated with said leash housing for retaining at least one waste bag therein; and e) a collapsible dish stored within said leash housing, said collapsible dish being segmented into a plurality of foldable sections; and f) said sections of said collapsible dish having gasket elements peripherally disposed on the edges thereof to seal said dish to prevent leakage of contained fluid therefrom.

13. The multi-purpose pet leash according to claim 12, wherein said collapsible dish is stored within said handle when in the collapsed position.

* * * * *